July 25, 1939.　　　　E. R. WOLFERT　　　　2,167,018
REFRIGERATING APPARATUS
Filed Feb. 23, 1938
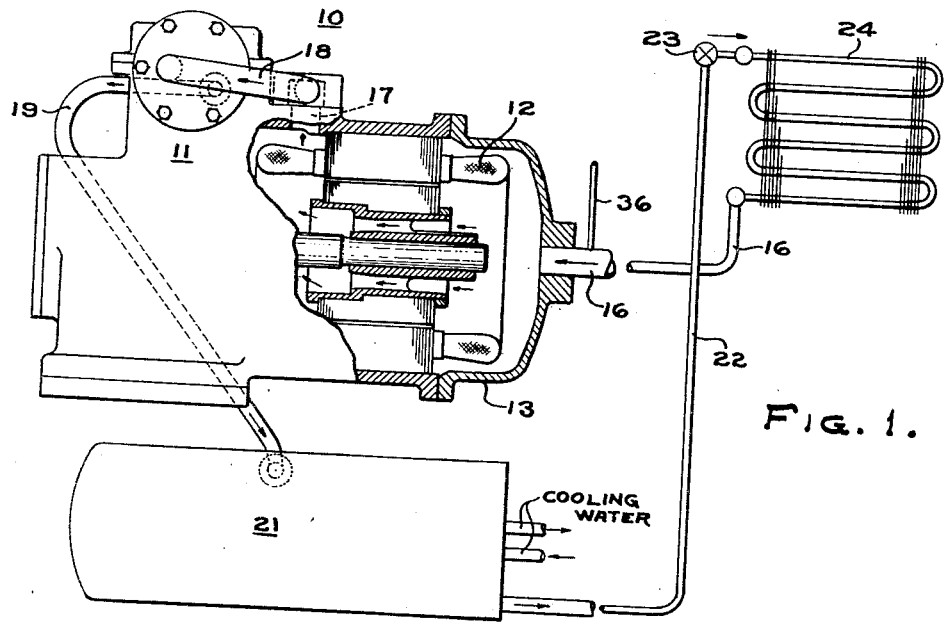
INVENTOR
EDWARD R. WOLFERT.
BY [signature]
ATTORNEY Patented July 25, 1939

2,167,018

UNITED STATES PATENT OFFICE 2,167,018

REFRIGERATING APPARATUS

Edward R. Wolfert, Springfield, Mass., assignor to Westinghouse Electric & Manufacturing Company, East Pittsburgh, Pa., a corporation of Pennsylvania Application February 23, 1938, Serial No. 191,978

8 Claims. (Cl. 62—4)

My invention relates to refrigerating apparatus, more particularly to an enclosed motor-compressor unit including a capacitor motor cooled by the refrigerant suction gas flowing to the compressor, and it has for an object to provide improved apparatus.

In the operation of refrigerating apparatus, a low suction pressure may be encountered at times on account of a low cooling load condition. As the density of the suction gas is lower at low pressure, and the volumetric efficiency of the compressor is somewhat less, the cooling effect on the motor is reduced. At the same time, the load on the compressor and the motor is reduced upon decreased suction pressure, since a smaller quantity of refrigerant is compressed. The reduction in load on the motor reduces the current flowing through the main winding of the motor, so that excessive heating thereof does not occur. The current through the auxiliary winding in series with the condenser or capacitor, however, is substantially constant over a wide range of loads, so that excessive heating of the auxiliary winding may occur due to the reduction in cooling effect of the refrigerant suction gas.

It is a particular object of my invention to avoid excessive heating of the motor as set forth above.

In accordance with my invention, I reduce the current flowing through the auxiliary winding in response to an operating condition, such as a low pressure of the refrigerant suction gas indicating danger of overheating of the character set forth. The current is preferably reduced by reducing the capacity of the condenser or capacitor in series with the auxiliary winding. The capacitor preferably comprises several elements in parallel with each other, in which case the reduction in capacity may be effected by opening the circuit through one or two of these elements.

The above and other objects are effected by my invention as will be apparent from the following description and claims taken in connection with the accompanying drawing, forming a part of this application, in which:

Fig. 1 is a diagrammatic view of a refrigerating system to which my invention may be applied;

Fig. 2 is a wiring diagram of the electrical apparatus for the refrigerating system shown in Fig. 1 and incorporating my invention; and, Fig. 3 is a wiring diagram of a second embodiment.

Referring to Fig. 1, I show a motor-compressor unit 10 including a compressor 11, a motor 12 driving the compressor, and a fluid-tight casing 13 enclosing both the compressor and the motor.

In this embodiment, the motor 12 is a single phase motor of the capacitor type, including, as represented in Fig. 2, a main winding 14 and an auxiliary winding 15. The motor 12 is cooled by conveying expanded or suction refrigerant gas through the motor containing portion of the casing 13. The refrigerant gas is admitted from the suction conduit 16 to one end of the motor containing portion of the casing, conveyed therethrough in contact with the rotor and stator of the motor, and then withdrawn from said motor containing portion at the opposite end thereof as indicated at 17. It is then conveyed through a conduit 18 to the inlet of the compressor 11.

The compressed refrigerant is conveyed by a conduit 19 to a refrigerant condenser 21 in which it is condensed. The condensed refrigerant is conveyed through a conduit 22 and an expansion valve 23 to an evaporator 24. In the evaporator, the refrigerant effects cooling action by vaporization of the liquid refrigerant, and the vaporized refrigerant is then discharged to the suction conduit 16 through which it is returned to the motor-compressor unit 10. While I have shown the evaporator 24 diagrammatically, it is to be understood that my invention contemplates any suitable type of evaporator structure, particularly an evaporator structure that is subjected to variable load conditions that may result in a reduced suction pressure. The expansion valve 23 is of a type which permits the pressure in the evaporator to vary with the load thereon, and it is preferably a thermostatic expansion valve operating in response to the superheat of the vaporized refrigerant discharged from the evaporator.

Referring to Fig. 2, electric current for energizing the motor 12 and for controlling the operation thereof may be supplied from any suitable source through line conductors $L_1$ and $L_2$. A thermostatic switch 25 is adapted to connect conductors 26 and 27 to the line conductors $L_1$ and $L_2$. The thermostatic switch 25 is responsive to a cooling load condition, and is preferably subjected to the temperature in the space that is cooled by the evaporator 24. The terminals of the main winding 14 are connected to the conductors 26 and 27, respectively, so that the main winding is energized when the thermostatic switch 25 is closed.

Four electrical condenser or capacitor elements, 28, 29, 30 and 31, are connected in parallel with each other and in series with the auxiliary winding 15 to supply leading current thereto. An auto-transformer 32 provides an increased voltage across the condenser elements during the starting period. A relay 33 provides the proper electrical connections for the starting period. A thermal accelerating relay 34a is provided to measure the predetermined starting period, and is adapted to de-energize the relay 33 at the end of the starting period through a relay 35a.

A pressure responsive device 34 is provided to open the circuit through the condenser elements 31 and 30 as the suction pressure reaches successively lower predetermined values. It includes a bellows 35 connected to the suction conduit 16 through a tube 36. The bellows 35 actuates switches 37 and 38, which are adapted to cut the capacitor elements 31 and 30 out of the circuit by means of relays 39 and 40. The latter are arranged to close their contacts when de-energized, as shown on the drawing. Resistances 39' and 40' may be connected across the contacts of the relays 39 and 40 to lower the duty thereon. It is to be understood that the bellows 35 may directly actuate the contacts which open the circuit through the capacitor elements 30 and 31, instead of controlling through relays. The several electrical connections and the remaining details of the electrical system will be apparent from Fig. 2 of the drawing and from the following description of the operation.

*Operation*

As the temperature in the space cooled by the evaporator rises above the value desired to be maintained therein, the thermostatic switch 25 closes its contacts to connect the conductors 26 and 27 to the line conductors L1 and L2, respectively. The main winding 14 and the relay 33, which are connected directly across the conductors 26 and 27, are energized. Contacts 43 of the relay 33 close a circuit 44 extending from the conductor 27 to an intermediate tap 45 of the auto-transformer 32. Contacts 46 of the relay 33 connect the left hand terminals of the several condenser elements to the left hand terminal 47 of the auto-transformer, thereby imposing increased voltage on the condenser elements. Contacts 48 and 49 are closed merely to assure that the circuits through the capacitor elements 30 and 31 are closed in the event that one or both of the relays 39 and 40 are energized. The contacts 50 of the relay 33 disconnect the capacitor elements directly from the conductor 27.

These connections continue during the starting period, during which the temperature of the heating element 51 of the thermal accelerating relay 34a is increasing. As a predetermined temperature is reached, the thermostat 52 of said relay closes its contacts and energizes the relay 35a. The latter de-energizes the relay 33 and completes a holding circuit for itself which extends through a resistance 53.

As the relay 33 is de-energized, the contacts 43 open the circuit 44 to disconnect the auto-transformer from the conductor 27. The circuit through the heating element 51 is also opened. The contacts 46 open to disconnect the left-hand terminals of the capacitor elements from the terminal 47 of the auto-transformer, and the contacts 50° are closed to connect the same directly to the conductor 27. The contacts 48 and 49 are opened to place the capacitor elements 30 and 31 under the control of the pressure responsive device 34.

As long as the suction pressure, that is, the pressure of the vaporized refrigerant flowing through the suction conduit 16 and over the stator and the rotor of the motor to the inlet of the compressor, remains at a sufficiently high value to provide adequate cooling of the motor, the contacts 37 and 38 remain open. The relays 39 and 40 remain de-energized, closing their contacts to complete the circuits through the capacitor elements 30 and 31, and providing full capacity of the condenser or capacitor constituted by the several elements 28 to 31. The apparatus operates in the same manner with full condenser capacity as long as the suction pressure remains above a minimum normal value, sufficient to provide adequate cooling of the motor.

In the operation of refrigerating apparatus, the suction pressure at times may, for reasons which need not here be considered, be reduced to an abnormally low value. As the suction pressure is reduced, the density of the refrigerant gas is correspondingly reduced. The reduction in the density of the gas has two effects; first, it reduces the cooling effect on the motor, and secondly, it reduces the load on the compressor and the motor because the volume of suction gas compressed represents a reduced quantity or mass of refrigerant. In the case of the main winding 14, and also in the case of the windings of a polyphase motor, the current is reduced with reduction in load so that the reduction in cooling effect does not result in excessive heating. However, the current flowing through the auxiliary winding 15, which is in series with the capacitor, is substantially constant over a wide range of loads, and is substantially full load current. Consequently, excessive heating of the auxiliary winding may occur if full condenser capacity is maintained. In accordance with my invention I reduce the condenser capacity, by opening the circuit through two of the condenser elements, when the suction pressure reaches an abnormally low value. This reduces the current flowing through the auxiliary winding and hence avoids overheating. The reduced condenser capacity reduces the pull-out torques of the motor, but this is permissible in the case of an abnormally low suction pressure since the motor load is also reduced.

The reduction in condenser capacity upon an abnormally low suction pressure is effected as follows: Upon decrease in suction pressure, the bellows 35 contracts and first closes the contacts 37 to energize the relay 39. The latter opens its contacts, thereby opening the circuit through the capacitor element 31. The total capacity of the capacitor elements in series with auxiliary winding 15 is thereby reduced so that the current therethrough is also reduced. As the pressure decreases to a second and lower predetermined value, the contacts 38 are closed to energize the relay 40. The latter opens the circuit through the capacitor element 30, thereby decreasing still further the total capacity in series with the auxiliary winding 15 and still further decreasing the current flowing therethrough. The heating of the auxiliary winding 15 is accordingly reduced, so that danger of overheating of the auxiliary winding, because of the reduced cooling capacity of the refrigerant gas, is substantially eliminated.

In Fig. 3, I show a second embodiment of my invention in which the voltage imposed on the condenser is not increased for starting. Also, the condenser capacity is reduced in only a single step and the pressure responsive means operates the contacts for cutting out some of the capacitor elements directly instead of through a relay.

This embodiment will be apparent from Fig. 3, especially in view of the foregoing description of Fig. 2. In this embodiment, the capacitor elements 30a and 31a are connected in parallel and are both controlled by a switch 54 which is actuated directly by the bellows 35. A resistance 55 may be connected across the contacts 54 to lower the duty on these contacts.

The operation of this embodiment will be apparent from the description above. As the suction pressure decreases to an abnormally low value, the bellows 35 opens the switch 54, thereby opening the circuit through the condenser elements 30a and 31a. Accordingly, the condenser capacity in series with the auxiliary winding 15 is reduced.

While I prefer to reduce the condenser capacity in response to reduced suction pressure, it will be apparent that it may be effected in response to any condition indicating danger of overheating, such as, for example, increased temperature of the motor.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In refrigerating apparatus, the combination of a compressor, a motor for driving said compressor, said motor being of a type in which the current flowing therethrough is not decreased in proportion to the reduction in load occurring upon decrease in pressure of the suction gas entering the compressor, means for conveying expanded refrigerant gas in contact with said motor for cooling the same and then admitting said gas to the compressor, and means for automatically reducing the current flowing through said motor in response to a predetermined minimum pressure of said expanded refrigerant gas.

2. In refrigerating apparatus, the combination of a compressor, a motor for driving said compressor, said motor including a main winding and an auxiliary winding, said auxiliary winding being of a type such that the current flowing therethrough is substantially constant over a wide range of loads, means for conveying expanded refrigerant gas in contact with said motor for cooling the same and then admitting said gas to the compressor, and means for automatically reducing the current flowing through said auxiliary winding in response to an operating condition indicating increased heating of said motor, in order to avoid overheating thereof.

3. In refrigerating apparatus, the combination of a compressor, a motor for driving said compressor, said motor including a main winding, and an auxiliary winding characterized in that the current flowing therethrough is substantially constant over a wide range of loads, means for conveying expanded refrigerant gas in heat transfer relation to said motor for cooling the same, and means operable in response to reduced cooling capacity of said expanded refrigerant gas for reducing the current flowing through said auxiliary winding of the motor.

4. In refrigerating apparatus, the combination of a compressor, a motor for driving said compressor, said motor including a main winding, an auxiliary winding and a capacitor in series with said auxiliary winding, means for conveying expanded refrigerant gas in heat transfer relation to said motor for cooling the same, and means operable in response to reduced cooling capacity of said expanded refrigerant gas for reducing the current flowing through said auxiliary winding of the motor.

5. In refrigerating apparatus, the combination of a compressor, a capacitor motor for driving said compressor, means for conveying suction gas in heat transfer relation to said motor for cooling the same, and means operable in response to a predetermined low pressure of said suction gas for reducing the current flowing through the capacitor winding of said motor.

6. In refrigerating apparatus, the combination of a compressor, a motor for driving said compressor, said motor including a main winding, an auxiliary winding and a condenser in series with said auxiliary winding, means for conveying suction gas in heat transfer relation to said motor for cooling the same, and means operable in response to a predetermined low pressure of said suction gas for reducing the current flowing through said auxiliary winding of the motor.

7. In refrigerating apparatus, the combination of a compressor, an electric motor for driving the compressor, said motor including an auxiliary winding and a condenser or capacitor connected in series therewith, means for conveying suction gas in heat transfer relation to said motor for cooling the same, and means operable in response to a predetermined minimum pressure of said suction gas for reducing the capacity of the condenser or capacitor connected in series with said auxiliary winding.

8. In refrigerating apparatus, the combination of a compressor, an electric motor for driving the compressor, said motor including an auxiliary winding and a plurality of capacitor elements connected in series therewith, means for conveying suction gas in heat transfer relation to said motor for cooling the same, and means operable in response to a predetermined minimum pressure of said suction gas for open-circuiting one of said capacitor elements.

EDWARD R. WOLFERT.